United States Patent
Bettler et al.

(10) Patent No.: US 8,105,432 B2
(45) Date of Patent: *Jan. 31, 2012

(54) EASY TO DISPERSE, HIGH DURABILITY TIO₂ PIGMENT AND METHOD OF MAKING SAME

(75) Inventors: Charles Robert Bettler, Newark, DE (US); Michael Patrick Diebold, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/904,891

(22) Filed: Sep. 28, 2007

(65) Prior Publication Data

US 2008/0085951 A1    Apr. 10, 2008

Related U.S. Application Data

(63) Continuation of application No. 11/136,064, filed on May 24, 2005, which is a continuation of application No. 10/921,510, filed on Aug. 19, 2004, now abandoned, which is a continuation of application No. 10/282,461, filed on Oct. 29, 2002, now Pat. No. 6,783,586.

(60) Provisional application No. 60/319,004, filed on Nov. 1, 2001, provisional application No. 60/319,003, filed on Nov. 1, 2001.

(51) Int. Cl.
C09C 1/36 (2006.01)
B32B 5/16 (2006.01)
B32B 9/00 (2006.01)
B32B 15/02 (2006.01)

(52) U.S. Cl. ........ 106/446; 106/442; 106/436; 106/300; 106/447; 106/438; 428/403; 428/404

(58) Field of Classification Search ............... 106/442, 106/436, 447, 438, 300, 446; 428/403, 404
See application file for complete search history.

(56) References Cited

U.S. PATENT DOCUMENTS

| | | | |
|---|---|---|---|
| 2,150,236 A * | 3/1939 | McKinney | 106/444 |
| 2,885,366 A | 5/1959 | Iler et al. | |
| 3,437,502 A | 4/1969 | Werner et al. | |
| 3,506,466 A | 4/1970 | Bramekamp et al. | |
| 3,510,333 A * | 5/1970 | Gonick et al. | 106/446 |
| 3,663,284 A | 5/1972 | Stancioff et al. | |
| 3,825,438 A | 7/1974 | Pritchard et al. | |
| 4,069,186 A * | 1/1978 | Ramig | 523/221 |
| 4,125,412 A * | 11/1978 | West | 106/446 |
| 4,172,160 A | 10/1979 | Stoner, III | |
| 4,276,211 A * | 6/1981 | Singer et al. | 524/200 |
| 4,305,082 A | 12/1981 | Kusakawa et al. | |
| 4,376,655 A | 3/1983 | Weber | |
| 4,737,194 A | 4/1988 | Jacobson | |
| 4,981,882 A | 1/1991 | Smith et al. | |
| 5,340,393 A * | 8/1994 | Jacobson | 106/492 |
| 5,562,990 A | 10/1996 | Tooley | |
| 5,650,002 A * | 7/1997 | Bolt | 106/438 |
| 5,700,318 A | 12/1997 | Brand et al. | |
| 5,730,796 A | 3/1998 | Brand et al. | |
| 5,824,145 A | 10/1998 | Marganski et al. | |
| 5,824,146 A | 10/1998 | Ott | |
| 5,976,237 A | 11/1999 | Halko et al. | |
| 5,993,533 A * | 11/1999 | Diebold et al. | 106/442 |
| 5,998,560 A | 12/1999 | Decker et al. | |
| 6,200,375 B1 | 3/2001 | Guez et al. | |
| 6,429,237 B1 | 8/2002 | Tooley | |
| 6,783,586 B2 | 8/2004 | Bettler et al. | |
| 2003/0089278 A1 | 5/2003 | Bettler et al. | |
| 2005/0129634 A1 | 6/2005 | Frerichs et al. | |
| 2005/0135994 A1 | 6/2005 | Frerichs et al. | |
| 2006/0124888 A1 | 6/2006 | Morrison, Jr. | |

FOREIGN PATENT DOCUMENTS

| | | |
|---|---|---|
| AU | 224322 | 9/1958 |
| EP | 1544256 A | 6/2005 |

OTHER PUBLICATIONS

Hidber P C et al., "Citric Acid—A Dispersant for Aqueous Alumina Suspensions" Journal of the American Ceramic Society, Blackwell Publishing. Malden, MA, US, vol. 79, No. 7, July 1996. pp. 1857-1867 XP002395724.
International Search Report Dated, International Application No. PCT/US02/36362, International filing date: Nov. 1, 2002.
International Search Report Dated Jan. 31, 2003, International Application No. PCT/US02/36362, International filing date: Nov. 1, 2002.

* cited by examiner

*Primary Examiner* — Anthony Green
*Assistant Examiner* — Pegah Parvini

(57) ABSTRACT

The present invention relates to a $TiO_2$ pigment coated sequentially in a wet treatment process with hydrous silica and hydrous alumina both in the presence of citric acid wherein the resulting pigment is coated with from 1 to 4% amorphous alumina based on the weight of the untreated $TiO_2$; from 3 to 6% silica glass based on the weight of the untreated $TiO_2$.

6 Claims, No Drawings

EASY TO DISPERSE, HIGH DURABILITY TIO₂ PIGMENT AND METHOD OF MAKING SAME

CROSS REFERENCE TO RELATED APPLICATIONS

This application is a continuation of Ser. No. 11/136,064, filed May 24, 2005 which is a continuation of Ser. No. 10/921,510 filed on Aug. 19, 2004 which is a continuation of Ser. No. 10/282,461 filed on Oct. 29, 2002, now U.S. Pat. No. 6,783,586 which claims the benefit of U.S. Provisional Application Ser. No. 60/319,004 filed on Nov. 1, 2001, which are all incorporated herein by reference in their entireties.

BACKGROUND OF THE INVENTION

Addition, during $TiO_2$ surface treatment, of certain chemicals under specific conditions significantly enhance a number of pigment performance properties in paints. These properties include durability and ease-of dispersion. The chemicals added during surface treatment that improve pigment end-use performance include metal oxides, particularly aluminum oxides and silicon dioxide. The exact nature of these oxides may in turn be influenced by the conditions under which they are formed and the presence of other reagents during the precipitation process. The present invention provides an easy dispersing, high durability $TiO_2$ pigment and method of making that pigment. Such super-durable $TiO_2$ pigment with improved gloss retention (durability) and dispersibility (easy dispersing) is useful in a variety of exterior applications, including but not limited to powder, coil, automotive.

Some multi-purpose $TiO_2$ pigment grades that are commercially available are treated with a coating of amorphous alumina. In these products there is no silica present as a surface treatment. Although these products have durability that is sufficient for architectural exterior coatings, they are not super-durable. In these products materials such as zirconia and tin are used to stabilize the amorphous alumina. The use of zirconia and tin makes these grades more expensive to manufacture and to use. The present invention uses citric acid to stabilize the amorphous alumina. The combination of silica and citric acid stabilized amorphous alumina on a pigment seems to be a new approach that provides performance and cost efficiencies.

U.S. Pat. No. 3,825,438 teaches a process to make a coated titanium dioxide pigment with one or more hydrous oxides in the presence of a polyhydric alcohol and/or a carboxylic acid. In this process, the alcohol or acid may be added at any time in the process prior to the completion of the deposition of the coating. The teachings in U.S. Pat. No. 3,825,438 solve the problem of pigment agglomeration on storage. A broad series of organic additives are taught in this patent to accomplish this desired result. A critical teaching is that the point at which the alcohol and/or acid are added in the process has no influence on the results achieved in the pigment product.

U.S. Pat. No. 5,340,393 teaches a method of making a non-agglomerated water insoluble inorganic particle having a dense, amorphous silica coating. Citric acid is identified as a possible optional charge stabilization dispersing acid that may be used in the process to prevent agglomeration of particles in the process. This patent offers no teaching as to the deposit of amorphous alumina or special properties resulting from the use of citric acid over other dispersants taught.

U.S. Pat. No. 5,730,796 teaches a process to make a durable pigment having a coating of cerium oxide, a coating of dense, amorphous silica and preferably an outer coating of crystalline (hydrous) alumina. It makes no teaching or suggestion with respect to the use of citric acid in deposition of silica or aluminia to enhance pigment properties U.S. Pat. No. 5,700,318 teaches an alumina coated inorganic pigment having a first coating of boehmite alumina, a second coating of amorphous alumina and a third coating of boehmite alumina. Adjustment of precipitation pH is taught as a means to produce the crystalline and amorphous alumina coatings. No teaching or suggestion is made with respect to the use of citric acid in this process.

U.S. Pat. No. 3,506,466 teaches the use of a salt of a water soluble alcohol amine and an easily water soluble oxycarboxylic acid to enhance dispersibility. The salt is added after wet treatment and before grinding the pigment.

U.S. Pat. No. 5,824,146 teaches a titanium dioxide pigment with amorphous alumina product in vapor phase oxidation of titanium tetrachloride in the presence of aluminum trichloride. The pigment is slurried using a citric acid dispersant.

U.S. Pat. No. 5,824,145 teaches mixtures of titanium dioxide pigment slurry and slurry of amorphous alumina hydroxide formed from mixing the two component slurries and using citric acid as a dispersing agent foe the mixed slurries. There is no wet treatment process disclosed in this patent.

U.S. Pat. Nos. 2,885,366 and 3,437,502 provide the basic teachings for making a durable titanium dioxide pigment having an amorphous silica coating followed by a coating of mixed crystalline alumina. Neither of these patents teach the use of citric acid during the wet treatment process used to deposit these treatments on the pigment surface.

BRIEF SUMMARY OF THE INVENTION

The present invention relates to a method for making an easy-dispersing, high durability titanium dioxide pigment comprising the steps in sequence:

A. (1) heating a slurry of titanium dioxide particles to a temperature of from 85 to 100° C.,
  (2) adding citric acid as a solution in water to the slurry to form a mixture,
  (3) adjusting the pH of the mixture to 10 or more,
  (4) adding sufficient sodium silicate as a water solution to the mixture to deposit silica on the surface of the particles of from 1 to 3% based on the weight of the titanium dioxide particles in the slurry,
  (5) neutralizing the slurry by addition of a mineral acid over the course of one hour, thereby forming a slurry of silica coated titanium dioxide particles; and B. (1) adjusting the temperature of the slurry of silica coated titanium dioxide particles to a temperature of from 55 to 90° C.,
  (2) adding sufficient sodium aluminate as a water solution to the slurry in step B(1) and adjusting the pH of the mixture formed to from 5 to 9 by addition of a strong mineral acid to deposit aluminia as $Al_2O_3$ of from 1 to 4% by weight based on the weight of titanium dioxide particles present in the slurry of step A(1) on the surface of the silica coated particles, and digesting the resulting mixture for from 15 to 30 minutes.

The method of the present invention may be used as a batch or a continuous process. In practicing the method it is preferred that in step A (1) the slurry is heated to a temperature of from 90 to 95° C. It is also preferred that citric acid be added to the slurry to a concentration based on the weight of the titanium dioxide particles of from 0.1 to 2%, and even more preferred that citric acid is added to a concentration of 0.3 to 0.5%.

The strong mineral acid used in the present invention is selected from the group consisting of nitric, hydrochloric and sulfuric acids. The most preferred acid to use when treating pigment made by the chloride process is hydrochloric acid, and the most preferred acid to use when treating pigment made by the sulfate process is sulfuric acid.

In the method of the present invention it is preferred in step B(2) that the addition of sodium aluminate solution and the pH adjustment by addition of mineral acid is done simultaneously.

The present process offers an improved method of making a titanium dioxide particles wherein the particles in a water slurry are wet treated with water solution of sodium silicate and sodium aluminate to form titanium dioxide having a first coating of silica followed by a second coating of aluminia wherein the improvement comprises adding citric acid to the titanium dioxide slurry before the addition of sodium silicate solution.

DETAILED DESCRIPTION OF THE INVENTION

The present invention provides a product and a process for making that product in which $TiO_2$ is coated sequentially in a wet treatment process with amorphous silica and amorphous alumina following procedures similar to those currently employed except that citric acid is added during the deposition process.

In a typical application of this invention, slurry of $TiO_2$ is heated to a predetermined temperature and citric acid is added. The slurry is then pH adjusted to a target and sodium silicate is added. The pH is slowly decreased to neutral by addition of acid, after which the slurry is allowed to digest for a period of time, at the end of which the pigment particles are well coated with a contiguous layer of silica. The temperature of the slurry is then changed, if desired, and sodium aluminate and acid are then added together in such a way that the final pH after reagent addition is controlled to a predetermined value. The slurry is allowed to digest for a certain amount of time, then processed into a finished material by well-established methods.

The following outlines the operation limits and ranges of the present process. Step 1 is the silica deposition. Level of citric acid is typically 0.5% citric acid based on weight of untreated $TiO_2$.

The concentration of $TiO_2$ in the slurry ranges from 200 to 450 grams per liter, although lower levels are also possible. The temperature is optimally from 85 to 100° C., although lower temperatures might also be effective.

The pre-silica deposition pH is typically above 10.0 although this may depend on the equipment used (lower pH is possible for continuous wet treatment). The optimal silica deposition weight is between 3 and 6% as $SiO_2$ based on weight of untreated $TiO_2$. However, improvements due to the invention are likely to be seen at any silica level.

Any strong mineral acid, including HCl, $HNO_3$ and $H_2SO_4$ may be used for neutralization. The optimal acid addition time for batch process is 30 minutes per 1% $SiO_2$ added. Longer times lead to better product at the expense of rate. Digestion time is typically 15 minutes per 1% silica. Shorter times lead to slightly worse product made at higher rate.

Step 2 alumina deposition: The initial temperature is optimally 55 to 90° C., although lower temperatures might also be effective (or even more effective. However, this requires chilling of the slurry at the expense of energy and time). Aluminate amount is Optimal between 1 and 4% as $Al_2O_3$ based on weight of untreated $TiO_2$. Lower levels will begin to degrade pigment performance properties (ease of dispersion; dispersion stability; gloss), as will higher levels (tint strength, hiding power, gloss). Any strong mineral acid, including HCl, $HNO_3$, and $H_2SO_4$ may be used.

Post addition pH: Optimal is between 5 and 9. Higher values might lead to undesired alumina phase; lower values to incomplete deposition. Digestion time is typically 15 to 30 minutes. Short times might lead to incomplete mixing/reacting of ingredients; long times needlessly decrease rate through the process.

Pigment compositions of the present invention include from 1 to 4% amorphous alumina based on the weight of the untreated $TiO_2$; from 3 to 6% silica based on the weight of the untreated $TiO_2$ where the silica is in the form of a silica glass.

Pigments of the present invention provide durability equal to that of DuPont's R-960 grade, but with dispersion qualities superior to an architectural pigment grade combined with gloss retention much improved over that of such durable grades as R-960. This combination of properties is reflected by the term super-durable as a description of pigment type.

Test Methods

Acid Solubility Test:
  10 mL 66% sulfuric acid is added to a test tube containing a magnetic stirring bar, and the tube is placed in an aluminum heating block and heated to 175°. A 0.2000 g pigment sample is added to the tube, and digested for 1 hour with stirring. At the conclusion of the digestion period, the tube containing the pigment sample is cooled by pouring the acid mixture into a beaker of ice, and the residue in the tube and beaker is washed with distilled water. The pigment residue in the tube and beaker is collected in a 100 mL volumetric flask, the volume made up to 100 mL by addition of distilled water, and the contents mixed thoroughly. The contents of the volumetric flask are then filtered, and 10 mL of the resulting filtrate are added to a 25 mL volumetric flask, to which 2 mL 20% hydrogen peroxide, and sufficient 10% sulfuric acid to make 25 mL, are added. The resulting solution is allowed to stand one hour. Absorbance of the solution is then read at 400 nm using a 10 mm cell path. Soluble $TiO_2$ is determined by reference to a previously prepared spectrophotometric curve obtained by measurement of samples containing known quantities of dissolved $TiO_2$.

Dispersibility Testing:
  The dispersibility of the $TiO_2$ pigment made according to Example 2 was determined and compared to commercially available $TiO_2$ pigments. Generally speaking, this determination was made by dispersing the pigments in an alkyd vehicle under two different controlled conditions that spanned a wide range of dispersion energies. The resulting dispersions were then let down with additional vehicle and tested for cleanness (number of undispersed particles) using a Hegman gauge. It is desirable that this number is minimal, and that low value is achieved under the mildest grind conditions. A more exact description of this procedure is provided in the text of Example 2.

EXAMPLES

Example 1

A rapidly stirred slurry of 2000 grams of $TiO_2$ particles in 5.5 liters of water was heated to 90° C., after which the pH was adjusted to 10.0 using a solution of sodium hydroxide in water. Citric acid (10 grams) was added and the pH of the slurry adjusted to 10.5. A solution of sodium silicate (125 ml, concentration equivalent to 400 g $SiO_2$ per liter) was added and the pH then lowered to 7.0 over the course of two hours by carefully controlled addition of 5 molar hydrochloric acid. The neutralized slurry was aged with stirring for 45 minutes while pH and temperature were maintained at 7.0 and 90° C., respectively. After aging, 175 ml of sodium aluminate, of concentration equivalent to 420 g $Al_2O_3$ per liter, was added. During this addition hydrochloric acid was also added such that the pH remained between 6.0 and 8.0 throughout. Slurry pH was adjusted to 7.0 and the slurry aged with stirring for 20 minutes. The pigment was filtered, washed, and dried overnight at 105° C. The dry pigment was screened through a 12 mesh sieve, then ground in an 8 inch micronizer.

Comparative Example 1A

Like example 1, except tartaric acid was used in place of citric acid.

Comparative Example 1B

Like example 1, except ethylene glycol was used in place of citric acid.

Comparative Example 1C

Like example 1, except tricarbolylic acid was used in place of citric acid.

Comparative Example 1D

Like example 1, except citric acid was omitted.
Summary of Results:
Pigment was subjected to the acid solubility test, which measures pigment durability, with the following results shown in Table 1.

TABLE 1

Comparison of the Effect of Carboxylic Acid
Selection on Acid Solubility of the Pigment

| Example | Acid Solubility |
| --- | --- |
| 1 | 10.2 |
| 1A | 17.5 |
| 1B | 19.0 |
| 1C | 18.2 |
| 1D | 16.1 |

Data shown in Table 1 show that the use of citric acid in the pigment wet treatment resulted in a pigment having a substantially enhanced durability as measured by the acid solubility test—clearly a surprising result.

Example 2

This Example illustrates the improved dispersion quality of the pigment of the present invention. All solution used in the process were solutions in water.

2800 pounds raw $TiO_2$ (chloride process pigment collected before any wet treatment processing) was diluted with water to give a final $TiO_2$ concentration of 240 grams per liter and heated to 95° C. via steam injection. A 50 wt % solution of citric acid (17 pounds; 0.3% citric acid based on weight of $TiO_2$) was added. The pH of the resulting mixture was adjusted to pH greater than 10.0 using concentrated sodium hydroxide solution (50% by weight in water).

A solution of sodium silicate was added (27.2 gallons; 3.0% $SiO_2$ based on weight of $TiO_2$) and the pH of the resulting slurry was lowered to 7.0 over the course of 1 hour using a solution of 20% hydrochloric acid while maintaining the temperature at ca. 95° C. using steam. Once the addition of the acid was complete, the steam was turned off and the slurry was allowed to digest for one hour. Then, sodium aluminate (28.3 gallons; 2.6% $Al_2O_3$ based on weight of $TiO_2$) and hydrochloric acid were added together over a 20 minute period in a way that kept the pH of the slurry close to neutral. The slurry was allowed to digest for 30 minutes at the end of this addition, then the pH was adjusted to between 5.0 and 5.5. The resulting slurry was filtered and washed sufficiently to give a final pigment resistance of greater than 8 k-ohm. The filtered pigment was dried and ground using a fluid energy mill (micronizer).

Trimethylolpropane (0.18% C based on weight of $TiO_2$) was added to the pigment prior to grinding.

Pigment dispersion was tested as follows:

A mixture of 278 grams Beckosol 10-060 long oil soya alkyd resin (65% solids) and 362 grams $TiO_2$ pigment were added to a 1000-mL polyethylene tri-pour beaker. Using a 6" spatula, the pigment was blended with the liquid resin until it was fully wet in. The tri-pour beaker was then placed in a stainless steel, water-jacketed pot that was positioned within a laboratory Hockmeyer Disperser. A 3" Cowles blade was lowered to within ¼" of the bottom of the beaker and the pigment/resin mixture was ground at 650 RPM for one minute. After grinding, 106 g of this grind base and 119 g of Beckosol 10-060 resin were added to a metal paint can and shaken on a paint shaker for 10 minutes. Degree of dispersion was then measured using a Hegman gauge, where the paint was drawn down and the number of undispersed particles between Hegman value 7 and 4 for counted. For poorly dispersed samples, counting was discontinued once this number reached 40 and was simply reported as 40+. Each sample was measured multiple times and the average count reported. The results of this measurement indicated the ease with which the pigment dispersed into the resin using low dispersion energy. Lower counts indicate a greater ease of dispersion.

A second dispersion measurement was made for all pigments in a manner similar to that described above except the pigment/resin mixture was ground for three minutes at 650 RPM followed by five minutes at 1750 RPM followed by five minutes at 3000 RPM. The results of this second procedure indicated the ultimate performance that could be expected after a very energy intensive grind.

Results for pigment made according to Example 2 and several commercially available pigments were compared for their ease of dispersion. Results of these tests are given in Table 2. In this Table, commercial grades A through C contain surface treatments of silica and alumina; Commercial Grades D and E contain surface treatments of primarily alumina and zirconia. Commercial Grades B through E contain on their surfaces an organic dispersion aid (c. f. the Trimethylolpropane added to pigment Example 2). The data in this Table demonstrates that with enough energy most pigments will ultimately disperse well into the resin (e.g., have count numbers below 15). However, only the pigment made according to our invention disperses well at low grind energies. That is, pigment made according to the present invention displays an ease-of-dispersion that is not present in the commercial grades described above.

TABLE 2

Ease of Dispersion Comparison: Pigment of the Invention and
Commercially Available Universal or Durable Grade Products

| TiO$_2$ Pigment | Low Energy, Count | High Energy, Count |
|---|---|---|
| Example 2 | 3.2 | 2.7 |
| Commercial A | 40+ | 5.7 |
| Commercial B | 40+ | 5.0 |
| Commercial C | 40+ | 3.0 |
| Commercial D | 40+ | 8.7 |
| Commercial E | 40+ | 25.2 |

What is claimed is:

1. A method for making titanium dioxide particles surface coated with silica and alumina, comprising the steps in order:
   A. (1) heating a slurry of raw titanium dioxide particles to a temperature of from 85 to 100° C.,
   (2) adding citric acid as a solution in water to the slurry to form a mixture,
   (3) adjusting the pH of the mixture to 10 or more,
   (4) adding sufficient sodium silicate as a water solution to the mixture to deposit silica on the surface of the particles of from 1 to 6% based on the weight of the titanium dioxide particles in the slurry,
   (5) neutralizing the slurry by addition of a mineral acid over the course of one hour, thereby forming a slurry of silica coated titanium dioxide particles;
   B. (1) adjusting the temperature of the slurry of silica coated titanium dioxide particles to a temperature of from 55 to 90° C.,
   (2) adding sufficient sodium aluminate as a water solution to the slurry in step B(1) and adjusting the pH of the mixture formed to from 5 to 9 by addition of a strong mineral acid to deposit alumina as Al$_2$O$_3$ of from 1 to 4% by weight based on the weight of titanium dioxide particles present in the slurry of step A(1) on the surface of the silica coated particles, and digesting the resulting mixture for from 15 to 30 minutes to form the titanium dioxide particles surface coated sequentially with amorphous silica and amorphous alumina; and
   C. dispersing the surface coated titanium dioxide into a resin to form a coating formulation.

2. The method of claim 1 wherein the resin is an alkyd resin.

3. The method of claim 1 wherein in step A(1) the slurry is heated to a temperature of from 90 to 95° C.

4. The method of claim 1 wherein the citric acid is added to the slurry to a concentration based on the weight of the titanium dioxide particles of from 0.1 to 2%.

5. The method of claim 1 wherein the strong mineral acid is selected from the group consisting of nitric, hydrochloric and sulfuric acids.

6. The method of claim 1 wherein in step B(2) the addition of sodium aluminate solution and the pH adjustment by addition of mineral acid is done simultaneously.

* * * * *